United States Patent
Chen et al.

(10) Patent No.: US 11,283,232 B2
(45) Date of Patent: Mar. 22, 2022

(54) POWER-MEASURING PROTECTION METHOD AND LASER PROTECTION SYSTEM

(71) Applicant: Industrial Technology Research Institute, Hsin-Chu (TW)

(72) Inventors: Chih-Chun Chen, Kaohsiung (TW); Fu-Shun Ho, Tainan (TW); Chun-Chieh Yang, Tainan (TW); Yu-Cheng Song, Tainan (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 237 days.

(21) Appl. No.: 16/727,202

(22) Filed: Dec. 26, 2019

(65) Prior Publication Data
US 2021/0167571 A1 Jun. 3, 2021

(30) Foreign Application Priority Data
Nov. 28, 2019 (TW) .................... 108143406

(51) Int. Cl.
*H01S 3/13* (2006.01)
*G01J 1/42* (2006.01)
(Continued)

(52) U.S. Cl.
CPC .......... *H01S 3/1305* (2013.01); *G01J 1/0238* (2013.01); *G01J 1/0474* (2013.01); *G01J 1/42* (2013.01);
(Continued)

(58) Field of Classification Search
CPC .... H01S 3/1305; H01S 3/1306; H01S 3/0014; G01J 1/42; G01J 1/0474; G01J 1/44;
(Continued)

(56) References Cited

U.S. PATENT DOCUMENTS 5,402,433 A * 3/1995 Stiscia ................ H01S 5/06832
372/26
7,024,074 B2 4/2006 Capewell
(Continued)

FOREIGN PATENT DOCUMENTS

CN 101183136 A 5/2008
CN 201926504 U 8/2011
(Continued)

OTHER PUBLICATIONS

TW Notice of Allowance dated Sep. 25, 2020.

*Primary Examiner* — Jennifer D Bennett
(74) *Attorney, Agent, or Firm* — WPAT, PC

(57) ABSTRACT

A laser protection system includes a high-power laser source, an optical diffuser, a photo detector, a signal-processing device, and a control module. The high-power laser source generates a first laser light beam, and the optical diffuser attenuates a laser power of the first laser light beam to form a second laser light beam. The photo detector obtains an optical detection signal from the second laser light beam. The signal-processing device includes a signal conversion module, a processor, and an encoder. The signal conversion module transforms the optical detection signal into a measurement data eigenvalue. The encoder encodes the measurement data eigenvalue into a measured encoded data, and the setting data eigenvalue into a set encoded data. The control module evaluates the set encoded data and the measured encoded data to determine whether or not the high-power laser source needs to be stopped.

15 Claims, 3 Drawing Sheets

(51) Int. Cl.
  *G01J 1/04* (2006.01)
  *G02B 5/02* (2006.01)
  *G01J 1/44* (2006.01)
  *G01J 1/02* (2006.01)

(52) U.S. Cl.
  CPC .............. *G01J 1/44* (2013.01); *G02B 5/0247* (2013.01); *G01J 2001/4247* (2013.01); *G01J 2001/446* (2013.01)

(58) Field of Classification Search
  CPC .............. G01J 1/0238; G01J 2001/446; G01J 2001/4247; G01J 1/0228; G01J 1/4257; G02B 5/0247
  See application file for complete search history.

(56) References Cited

U.S. PATENT DOCUMENTS

| | | |
|---|---|---|
| 7,773,640 B2 | 8/2010 | Hu et al. |
| 7,944,954 B2 | 5/2011 | Jhang et al. |
| 8,204,350 B2 | 6/2012 | Lin et al. |
| 8,311,065 B2 | 11/2012 | Tsai et al. |
| 8,774,239 B2 | 7/2014 | Jhang et al. |
| 8,988,673 B2 | 3/2015 | Guttman et al. |
| 2005/0083828 A1 | 4/2005 | Chen |

FOREIGN PATENT DOCUMENTS

| | | | |
|---|---|---|---|
| CN | 103427801 A | | 12/2013 |
| CN | 105318968 A | * | 2/2016 |
| CN | 106225918 B | | 12/2018 |
| CN | 110429466 A | * | 11/2019 |
| TW | 346693 | | 12/1998 |
| TW | M249343 | | 11/2004 |
| TW | I337267 | | 2/2011 |
| TW | I380542 | | 12/2012 |
| TW | I623755 | | 5/2018 |
| TW | I641813 | | 11/2018 |
| TW | I659583 | | 5/2019 |
| WO | WO2018/020709 A1 | | 2/2018 |

* cited by examiner

POWER-MEASURING PROTECTION METHOD AND LASER PROTECTION SYSTEM

CROSS REFERENCE TO RELATED APPLICATION

This application claims the benefits of Taiwan application Serial No. 108143406, filed on Nov. 28, 2019, the disclosures of which are incorporated by references herein in its entirety.

TECHNICAL FIELD

The present disclosure relates in general to a power-measuring protection method and a laser protection system.

BACKGROUND

A laser is a kind of light that is emitted through a process of optical amplification based on the stimulated emission of electromagnetic radiation. One of many applications of the laser is in the measurement field, particularly in a high-power laser measurement system. In the high-power laser measurement system, a photo detector is generally used for real-time measuring output power of the high-power laser system. However, a conventional photo detector has its own limit in power endurance, and yet it is usually the case that intensity of the light to be detected or the reflected light from the high-power laser system is higher than the power endurance of the photo detector purchased from the marketplace. In other words, since the output power of the conventional high-power laser is too high, a normal photo detector can't be directly used for detection. Thus, to meet the aforesaid power limit, multiple optical elements are applied in advance for attenuating the output power of the emission light prior to a power measurement can be made. Alternatively, a power meter is also introduced for measurement and protection. Namely, in the art, several optical elements are used for attenuating power of the high-power laser, before the photo detector can effectively and safely perform detection. In addition, the higher the emission power of the high-power laser is, so the higher the reflection power is. Therefore, the required number of the attenuator would go high. In other words, beside that the conventional device can't be directly applied for light detection, another problem is the cost hike and cumbersome size caused by the inclusion of these optical attenuators.

In addition, the conventional mechanism for high-power measurement can perform only the detection without feedback and modulation. Thus, in meeting an abnormal optical signal, only an error or abnormal message can be displayed in the high-power laser system. Namely, no feedback and modulation mechanism exist to prevent the high-power laser system from being damaged by the power abnormality.

SUMMARY

Accordingly, an object of the present disclosure is to provide a power-measuring protection method and a laser protection system, that utilizes an optical diffuser to form a protection mechanism. With this protection mechanism, the overall cost and the entire space occupation of the laser protection system can be substantially reduced, the high-power laser system can be protected, and an apparatus with feedback, modulation and reaction functions can be established.

In one embodiment of this disclosure, a laser protection system includes a high-power laser source, an optical diffuser, a photo detector, a signal-processing device and a control module. The high-power laser source is used for evaluating a setting data to generate a first laser light beam. The optical diffuser is used for receiving the first laser light beam and attenuating a laser power of the first laser light beam so as to form a second laser light beam. The photo detector is used for detecting the second laser light beam to obtain an optical detection signal of the second laser light beam. The signal-processing device, connected with the photo detector, includes a signal conversion module, a processor and an encoder. The signal conversion module is used for transforming the optical detection signal into a measurement data eigenvalue. The processor is used for receiving the measurement data eigenvalue and a setting data eigenvalue, and further for transmitting the measurement data eigenvalue and the setting data eigenvalue to the encoder. The setting data eigenvalue is transformed from the setting data. The encoder is used for encoding the measurement data eigenvalue into a measured encoded data, and also for encoding the setting data eigenvalue into a set encoded data. The control module, used for transmitting the setting data to the high-power laser source, is connected with the signal-processing device. The encoder is used for transmitting the measured encoded data and the set encoded data to the control module, then the control module can evaluate the set encoded data and the measured encoded data to determine whether or not the high-power laser source needs to be stopped.

In another aspect of this disclosure, a power-measuring protection method, applied to a high-power laser system including a high-power laser source further having a setting data eigenvalue, includes a step of applying an optical diffuser to attenuate a laser power of a first laser light beam to form a second laser light beam; a step of applying a photo detector to detect the second laser light beam to obtain an optical detection signal; a step of applying a signal conversion module to transform the optical detection signal into a measurement data eigenvalue; a step of applying a processor to receive the measurement data eigenvalue and the setting data eigenvalue, and to further transmit the measurement data eigenvalue and the setting data eigenvalue to an encoder; a step of applying the encoder to encode the measurement data eigenvalue and the setting data eigenvalue, and then to transmit a corresponding measured encoded data and a corresponding set encoded data, respectively, to a control module; and, a step of applying the control module to evaluate the set encoded data and the measured encoded data to determine whether or not the high-power laser source needs to be stopped.

As stated above, unlike a conventional resort of using multiple attenuators simultaneously or a dynamometer to reduce the power of laser, the power-measuring protection method and the laser protection system provided by this disclosure introduce the optical diffuser to reduce the number of the required attenuators and the like optical devices, and so the cost and the occupied space can be reduced as well. Namely, upon minimizing the entire high-power laser system, protection on the same high-power laser system can be still upheld.

Further, since the measurement data eigenvalue and the setting data eigenvalue are encoded and encrypted in advance, thus possible noise interference while in transmitting the measured encoded data and the set encoded data can be substantially reduced or evenly avoided. Thereupon, the transmission of the measured encoded data and the set encoded data can be protected from foreign electromagnetic disturbance or noise interference caused by significant external electric currents. Namely, the system of this disclosure is thus equipped with a mechanism for defending noise interference, by which possible measurement errors caused by the noise interference can be reduced.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
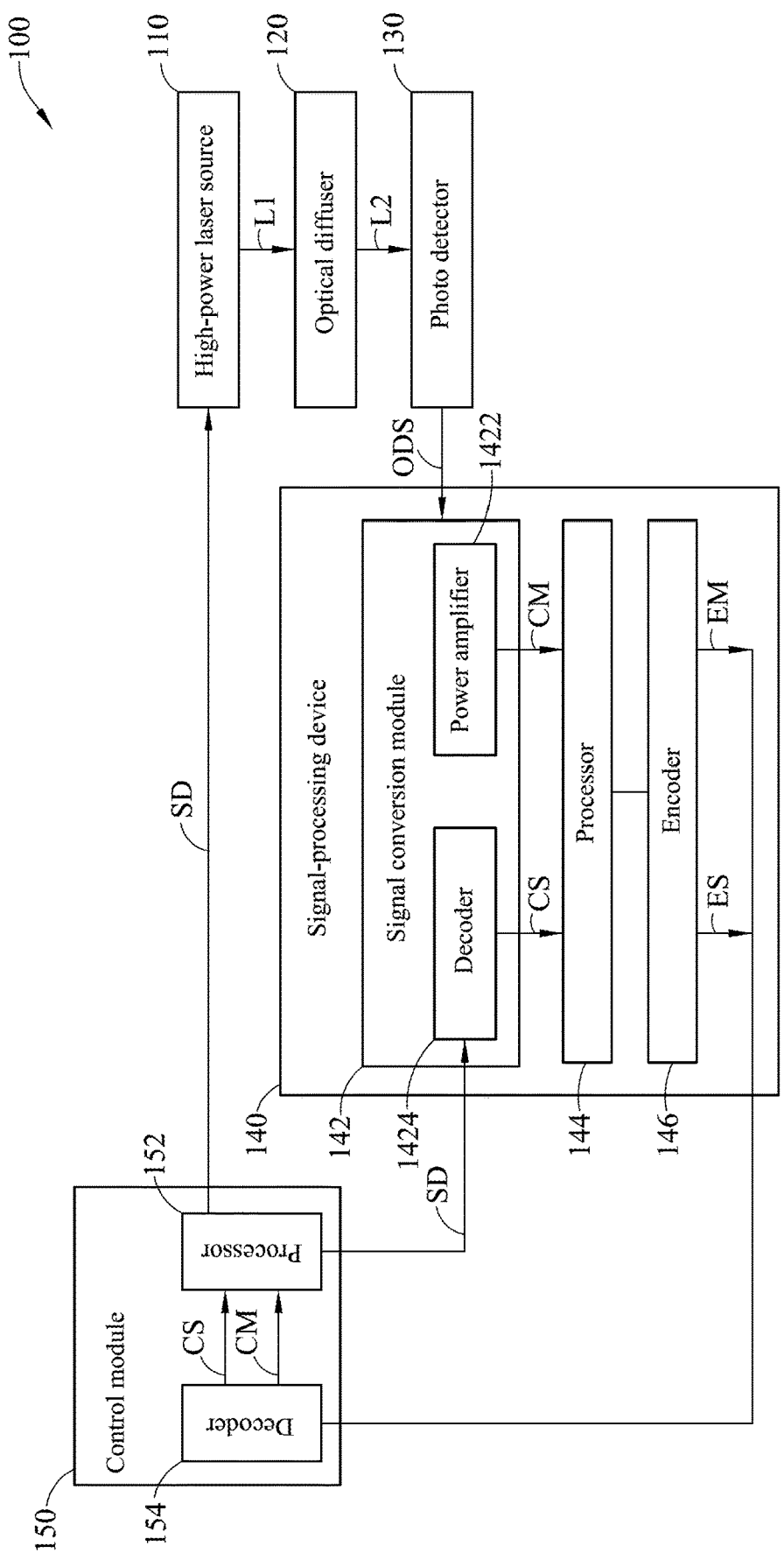
FIG. 1 is a schematic view of an embodiment of the laser protection system in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to FIG. 1, an embodiment of the laser protection system in accordance with this disclosure is schematically shown in a block form. The laser protection system 100 includes a high-power laser source 110, an optical diffuser 120, a photo detector 130, a signal-processing device 140 and a control module 150. In particular, a high-power laser system therein is formed by integrating the high-power laser source 110, the photo detector 130, the signal-processing device 140 and the control module 150, and the optical diffuser 120 is adopted as a protection mechanism for the high-power laser system.

In this embodiment, the control module 150 transmits setting data SD to the high-power laser source 110 to set up a laser power for the high-power laser source, and the high-power laser source 110 evaluates the setting data SD to generate a first laser light beam L1. The optical diffuser 120 for receiving the first laser light beam L1 attenuates the laser power of the first laser light beam L1 to a second laser light beam L2. Namely, a second laser light beam L2 is generated after the first laser light beam L1 passes through the optical diffuser 120, and the second laser light beam L2 has a laser power less than that of the first laser light beam L1. Practically, the optical diffuser 120 of this embodiment can be made of a porous material. Through the porosity to provide optical scattering and reflection, the first laser light beam L1 with a higher power can be attenuated to a degree able for the photo detector 130 to detect. In one embodiment, the porous material can be, but not limited to, a ceramics. Importantly, this disclosure does not teach a resort of using multiple attenuators simultaneously or a dynamometer to reduce the power of laser, but introduces the optical diffuser 120 to reduce the number of the attenuators and the like optical devices, and so as the cost and the occupied space. Namely, upon minimizing the laser protection system 100, protection of the high-power laser system can be still upheld.

In this embodiment, the photo detector 130 detects the second laser light beam L2 so as to obtain an optical detection signal ODS. The signal-processing device 140, connected with the photo detector 130, receives and processes the optical detection signal ODS. The optical detection signal ODS, after being processed by the signal-processing device 140, is then transmitted to the control module 150 for further comparison and investigation, so that any abnormality at the high-power laser system can be located in time.

In this embodiment, the signal-processing device 140 includes a signal conversion module 142, a processor 144 and an encoder 146. The signal conversion module 142 connects the processor 144, and then the processor 144 connects the encoder 146. The signal conversion module 142 is used for transforming the optical detection signal ODS into a measurement data eigenvalue CM; i.e., transforming the analog signal (the optical detection signal ODS) into a corresponding digital signal (the measurement data eigenvalue CM). In one embodiment, the signal conversion module 142 includes a power amplifier 1422 for receiving and then processing the optical detection signal ODS to generate the measurement data eigenvalue CM. The processor 144 is used for receiving the measurement data eigenvalue CM and a setting data eigenvalue CS, in which the setting data eigenvalue CS is obtained by transforming the setting data SD. In one embodiment, the signal conversion module 142 includes a decoder 1424 for decoding the setting data SD into the corresponding the setting data eigenvalue CS.

In this embodiment, the processor 144 firstly receives and integrates the measurement data eigenvalue CM and the setting data eigenvalue CS, and then transmits the integrated eigenvalues CM and CS to the encoder 146. In the encoder 146, the measurement data eigenvalue CM and the setting data eigenvalue CS are encoded into a measured encoded data EM and a set encoded data ES, respectively. The control module 150 is connected with the signal-processing device 140. The encoder 146 is used for transmitting the measured encoded data EM and the set encoded data ES to the control module 150. Then, the control module 150 evaluates the set encoded data ES and the measured encoded data EM to determine whether or not an operation of the high-power laser source 110 needs to be stopped.

Upon such an arrangement of this embodiment, after the measurement data eigenvalue CM and the setting data eigenvalue CS are encoded and encrypted, then the encrypted measured encoded data EM and set encoded data ES are transmitted into the control module 150, such that the possibility of noise interference to the measured encoded data EM and the set encoded data ES during transmission can be reduced, especially by external electromagnetic disturbance (EMI) and foreign noise interference caused by other big electric currents. In other words, this embodiment is thus equipped with a mechanism for defending noise, by which possible measurement errors caused by noise interference can be reduced.

In addition, in one embodiment, the control module 150 further includes a processor 152 and a decoder 154 connected with the processor 152. After the decoder 154 of the control module 150 receives the set encoded data ES and the measured encoded data EM, the decoder 154 decodes the set encoded data ES and the measured encoded data EM so as to obtain the measurement data eigenvalue CM and the setting data eigenvalue CS, and then the measurement data eigenvalue CM and the setting data eigenvalue CS are transmitted to the processor 152. The processor 152 evaluates the setting data eigenvalue CS to judge whether or not the measurement data eigenvalue CM is abnormal. For example, by comparing if or not the measurement data eigenvalue CM is matched with the setting data eigenvalue CS, then possible abnormality upon the measurement data eigenvalue CM can be detected. If the measurement data eigenvalue CM is determined to be abnormal (i.e., it implies that a difference between the measurement data eigenvalue CM and the setting data eigenvalue CS exists), then the operation of the high-power laser source 110 is stopped. On the other hand, if the measurement data eigenvalue CM is normal, then the high-power laser source 110 is kept running. In another example, at least two consecutive measurement data eigenvalues CM and two consecutive setting data eigenvalues CS are used for comparison. If differences are located in two consecutive comparisons between the measurement data eigenvalues CM and the corresponding setting data eigenvalues CS, then the abnormality of the measurement data eigenvalue CM can be confirmed, such that error judgment upon abnormality can be effectively avoided.

Figure 2:
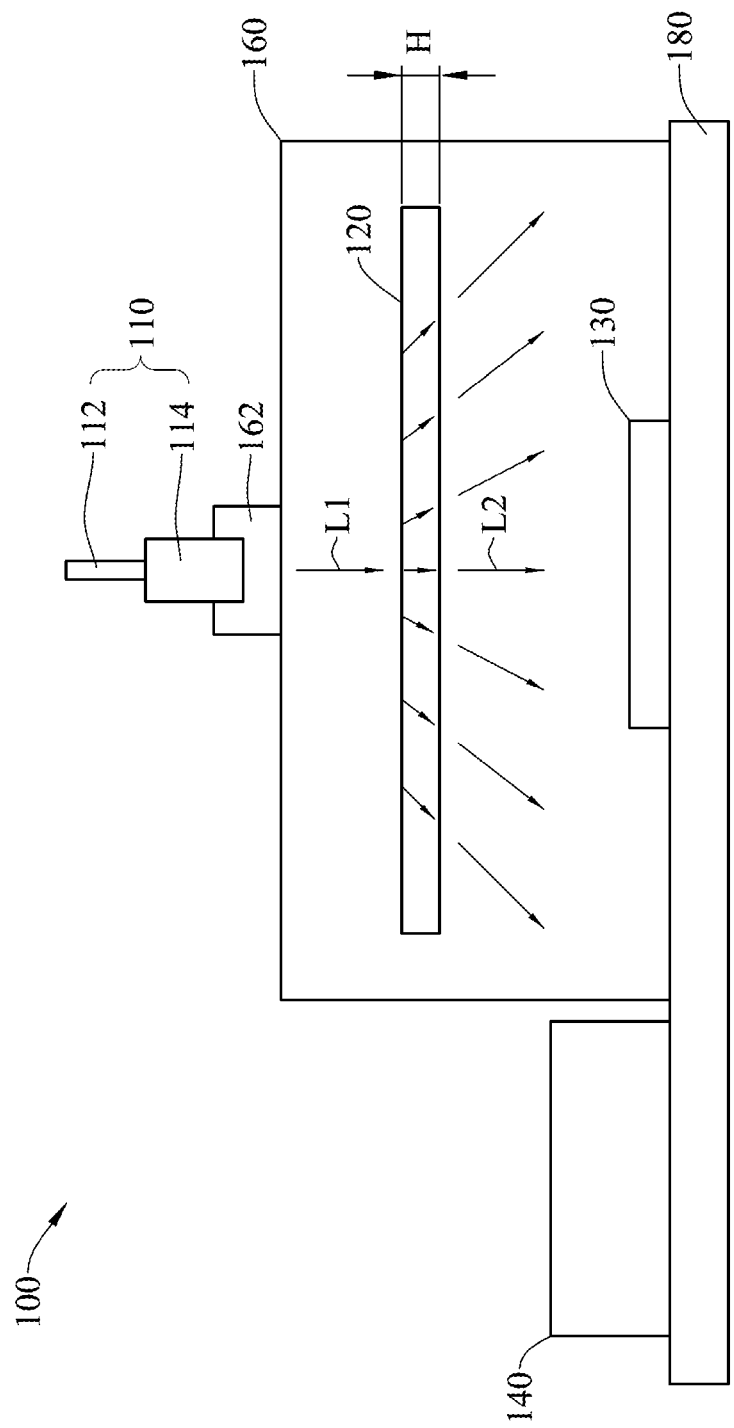
FIG. 2 demonstrates schematically a typical arrangement of the laser protection system in accordance with this disclosure.

Referring now to FIG. 2, a typical arrangement of the laser protection system 100 in accordance with this disclosure is demonstrated schematically. As shown in FIG. 1 and FIG. 2, the high-power laser source 110 includes an optical fiber 112 and a connector 114 connected with the optical fiber 112. The connector 114 can be an optical fiber splice, a ferrule connector (FC) or a metallic connector. Practically, the choice of the connector is mainly determined with the design requirements. The optical fiber 110 is used for transmitting the high-power first laser light beam L1 to pass through the connector 114. The optical diffuser 120, disposed between the high-power laser source 110 and the photo detector 130, is used for receiving the first laser light beam L1 and further attenuating the laser power of the first laser light beam L1 to produce the second laser light beam L2 with a lower laser power. The maximum laser power for the first laser light beam L1 that the optical diffuser 120 can sustain is proportional to the thickness H of the optical diffuser 120. For example, in the case that the optical diffuser 120 has a thickness H of 0.5 mm, then the laser power of the first laser light beam L1 can be within 2~10 W. The photo detector 130 can be a photodiode for detecting the attenuated second laser light beam L2, and is used for transforming the second laser light beam L2 into an optical detection signal ODS and further transmitting the optical detection signal ODS to the signal-processing device 140.

In one embodiment, the laser protection system 100 further includes a circuit board 180 mounting thereon the photo detector 130 and the signal-processing device 140. In another embodiment, the laser protection system 100 further includes a housing 160 and a locking connector 162 for locking thereinside the connector 114 via screwing. The housing 160 forming a hollow container accommodates the connector 114, the optical diffuser 120 and the photo detector 130, such that optical scattering would be prevented from damaging other components such as the high-power laser source 110. In addition, the housing 160 can be a metallic shell body for absorbing thermal energy generated at an optical diffusing film, and also for blocking the reflective and scattering light.

Figure 3:
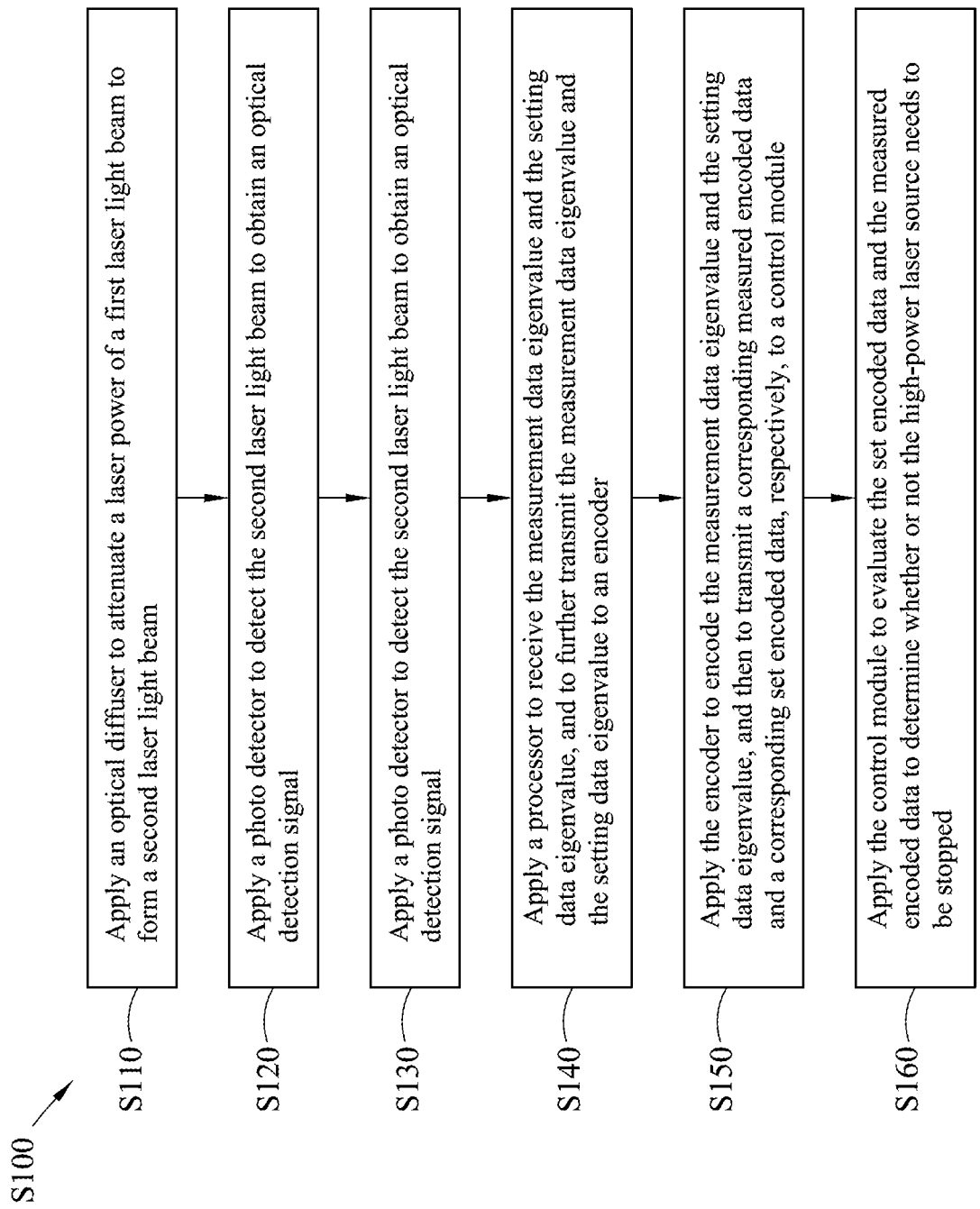
FIG. 3 is a flowchart of an embodiment of the protection method in accordance with this disclosure.

Referring now to FIG. 3, a flowchart of an embodiment of the power-measuring protection method in accordance with this disclosure is shown. In this embodiment, the power-measuring protection method S100 is used in a high-power laser system such as the one shown in FIG. 1 or FIG. 2. The high-power laser system includes at least the high-power laser source 110, the photo detector 130, the signal-processing device 140 and the control module 150. Also, the high-power laser system adopts the optical diffuser 120 to form a mechanism for protecting the high-power laser system.

In this embodiment, the power-measuring protection method S100 includes the following Step S110 to Step S160. In performing Step S110, the optical diffuser 120 is used to attenuate the laser power of the first laser light beam L1 so as to generate the second laser light beam L2. Referring to FIG. 1, the high-power laser source 110 is firstly used to generate the first laser light beam L1. In particular, the control module 150 can be used to transmit setting data SD for setting the laser power of the high-power laser 110, and the high-power laser 110 follows the setting data SD to emit the first laser light beam L1. In addition, Step S110 further includes a step of adopting the optical diffuser 120 made of a porous material to attenuate the laser power of the first laser light beam L1 so as to produce the second laser light beam L2 having the laser power less than that of the first laser light beam L1. In this embodiment, the porous material provides functions to scatter and reflect the laser light beam, such that the laser power of the output second laser light beam L2 can be smaller than the laser power of the input first laser light beam L1. Thereupon, the high-power first laser light beam L1 can be attenuated into a power range that the photo detector 130 can detect safely.

After Step S110, Step S120 is performed to use the photo detector 130 to detect the second laser light beam L2 so as to obtain the optical detection signal ODS. Then, in performing Step S130, the signal conversion module 140 is used to transform the optical detection signal ODS into the corresponding measurement data eigenvalue CM. In this embodiment, Step S130 further includes a step of passing the optical detection signal ODS through the power amplifier 1422 so as to produce the measurement data eigenvalue CM; i.e., to transform the optical detection signal ODS from an analog format into a digital format.

After Step S130, Step S140 is performed to have the processor 144 to receive the measurement data eigenvalue CM and the setting data eigenvalue CS, and further to transmit these two eigenvalues CM and CS to an encoder 146. In one embodiment, prior to Step S140, the method S100 further includes a step of the control module 150 transmitting the setting data SD to the decoder 1424, so that the decoder 1424 can decode the setting data SD into the setting data eigenvalue CS, and then transmit the setting data eigenvalue CS to the processor 144. Namely, the setting data eigenvalue CS is transformed from the setting data SD.

After Step S140, the processor 144 receives and integrates the measurement data eigenvalue CM and the setting data eigenvalue CS. Then, in performing Step S150, the encoder 146 is introduced to encode the measurement data eigenvalue CM and the setting data eigenvalue CS. In this embodiment, the measurement data eigenvalue CM is encoded into the measured encoded data EM, and the setting data eigenvalue CS is encoded into the set encoded data ES.

The measured encoded data EM and the set encoded data ES are then transmitted to the control module 150. According to this embodiment, since the measurement data eigenvalue CM and the setting data eigenvalue CS are encoded and encrypted in advance, thus possible noise interference while in transmitting the measured encoded data EM and the set encoded data ES can be substantially reduced or evenly avoided. Thereupon, the transmission of the measured encoded data EM and the set encoded data ES can be protected from foreign electromagnetic disturbance (EMI) and noise interference caused by significant external electric currents. Namely, this embodiment is thus equipped with a mechanism for defending noise interference, by which possible measurement errors caused by the noise interference can be reduced.

After Step S150, then Step S160 is performed to have the control module 150 to evaluate the set encoded data ES and the measured encoded data EM so as to determine whether or not the high-power laser source 110 needs to be stopped. In this embodiment, Step S160 further includes a step of decoding the set encoded data ES and the measured encoded data EM so as to obtain the setting data eigenvalue CS and the measurement data eigenvalue CM, respectively. Then, based on the setting data eigenvalue CS, it is determined whether or not the measurement data eigenvalue CM is normal. Then, in the case that the measurement data eigenvalue CM is judged to be abnormal, then the high-power laser source 110 is stopped. For example, in FIG. 1, the decoder 154 of the control module 150 and decode the set encoded data ES and the measured encoded data EM, so as to obtain the measurement data eigenvalue CM and the setting data eigenvalue CS, respectively; and, then the measurement data eigenvalue CM and the setting data eigenvalue CS are transmitted to the processor 152. The processor 152 evaluates the setting data eigenvalue CS to determine if or not the measurement data eigenvalue CM is normal. In one embodiment, by comparing if or not the measurement data eigenvalue CM is matched with the setting data eigenvalue CS, then possible abnormality upon the measurement data eigenvalue CM can be determined. If the measurement data eigenvalue CM is determined to be abnormal (i.e., it implies that a difference between the measurement data eigenvalue CM and the setting data eigenvalue CS exists), then the operation of the high-power laser source 110 would be stopped. On the other hand, if the measurement data eigenvalue CM is normal, then the high-power laser source 110 is kept running. In another example, at least two consecutive measurement data eigenvalues CM and two consecutive setting data eigenvalues CS are used for comparison. If differences are located in two consecutive comparisons between the measurement data eigenvalues CM and the corresponding setting data eigenvalues CS, then the abnormality of the measurement data eigenvalue CM can be confirmed, such that error judgment upon abnormality can be effectively avoided. Upon such an arrangement, the high-power laser system provided by this embodiment can be simultaneously furnished with the feedback and adjustment mechanism for protecting the high-power laser system.

In summary, unlike a conventional resort of using multiple attenuators simultaneously or a dynamometer to reduce the power of laser, the power-measuring protection method and the laser protection system provided by this disclosure introduce the optical diffuser to reduce the number of the required attenuators and the like optical devices, and so the cost and the occupied space can be reduced as well. Namely, upon minimizing the entire high-power laser system, protection on the same high-power laser system can be still upheld.

Further, since the measurement data eigenvalue and the setting data eigenvalue are encoded and encrypted in advance, thus possible noise interference while in transmitting the measured encoded data and the set encoded data can be substantially reduced or evenly avoided. Thereupon, the transmission of the measured encoded data and the set encoded data can be protected from foreign electromagnetic disturbance (EMI) or noise interference caused by significant external electric currents. Namely, the system of this disclosure is thus equipped with a mechanism for defending noise interference, by which possible measurement errors caused by the noise interference can be reduced.

In addition, this disclosure introduces the housing to shield the optical diffuser and the photo detector, such that optical scattering would be prevented from damaging other components such as the high-power laser source. Further, the housing can be made as a metallic shell body for absorbing thermal energy generated at an optical diffusing film, and also for blocking the reflective and scattering light.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A laser protection system, comprising:
    a high-power laser source, used for evaluating a setting data to generate a first laser light beam;
    an optical diffuser, used for receiving the first laser light beam and attenuating a laser power of the first laser light beam so as to form a second laser light beam;
    a photo detector, used for detecting the second laser light beam to obtain an optical detection signal of the second laser light beam;
    a signal-processing device, connected with the photo detector, including a signal conversion module, a processor and an encoder, the signal conversion module being used for transforming the optical detection signal into a measurement data eigenvalue, the processor being used for receiving the measurement data eigenvalue and a setting data eigenvalue, and for transmitting the measurement data eigenvalue and the setting data eigenvalue to the encoder, the setting data eigenvalue being transformed from the setting data, the encoder being used for encoding the measurement data eigenvalue into a measured encoded data, and for encoding the setting data eigenvalue into a set encoded data; and
    a control module, used for transmitting the setting data to the high-power laser source, connected with the signal-processing device, the encoder being used for transmitting the measured encoded data and the set encoded data to the control module, then the control module evaluating the set encoded data and the measured encoded data to determine whether or not the high-power laser source needs to be stopped.

2. The laser protection system of claim 1, wherein the optical diffuser is made of a porous material.

3. The laser protection system of claim 1, wherein the signal conversion module includes a decoder for decoding the setting data into the setting data eigenvalue.

4. The laser protection system of claim 1, wherein the signal conversion module includes a power amplifier for passing through the optical detection signal to generate the measurement data eigenvalue.

5. The laser protection system of claim 1, wherein the high-power laser source includes an optical fiber and a connector connected with the optical fiber.

6. The laser protection system of claim 5, further including a housing connected with the connector, the housing shielding thereinside the optical diffuser and the photo detector.

7. The laser protection system of claim 1, further including a circuit board mounting thereon the photo detector and the signal-processing device.

8. The laser protection system of claim 1, wherein the control module includes a decoder and a processor connected with the decoder, the decoder is used for decoding the set encoded data and the measured encoded data so as to obtain respectively the measurement data eigenvalue and the setting data eigenvalue, the processor evaluating the setting data eigenvalue to determine whether or not the measurement data eigenvalue is normal.

9. The laser protection system of claim 1, wherein the photo detector is a photodiode.

10. A power-measuring protection method, applied to a high-power laser system including a high-power laser source further having a setting data eigenvalue, comprising the steps of:
   (1) applying an optical diffuser to attenuate a laser power of a first laser light beam to form a second laser light beam;
   (2) applying a photo detector to detect the second laser light beam to obtain an optical detection signal;
   (3) applying a signal conversion module to transform the optical detection signal into a measurement data eigenvalue;
   (4) applying a processor to receive the measurement data eigenvalue and the setting data eigenvalue, and to further transmit the measurement data eigenvalue and the setting data eigenvalue to an encoder;
   (5) applying the encoder to encode the measurement data eigenvalue and the setting data eigenvalue, and then to transmit a corresponding measured encoded data and a corresponding set encoded data, respectively, to a control module; and
   (6) applying the control module to evaluate the set encoded data and the measured encoded data to determine whether or not the high-power laser source needs to be stopped.

11. The power-measuring protection method of claim 10, wherein the step (1) includes the steps of:
   (11) choosing the optical diffuser made of a porous material; and
   (12) utilizing porosity of the porous material to have a laser power of the second laser light beam to be less than the laser power of the first laser light beam.

12. The power-measuring protection method of claim 10, wherein the step (3) includes a step of passing the optical detection signal through a power amplifier to generate the measurement data eigenvalue.

13. The power-measuring protection method of claim 10, wherein the step (4) includes the steps of:
   (41) applying the control module to transmit a setting data to a decoder; and
   (42) applying the decoder to decode the setting data into the setting data eigenvalue, and to transmit the setting data eigenvalue to the processor.

14. The power-measuring protection method of claim 10, wherein the step (6) includes the steps of:
   (61) decoding the set encoded data and the measured encoded data to obtain the setting data eigenvalue and the measurement data eigenvalue, respectively;
   (62) evaluating the setting data eigenvalue to determine whether or not the measurement data eigenvalue is normal; and
   (63) if the measurement data eigenvalue is determined to be abnormal, then stopping the high-power laser source.

15. The power-measuring protection method of claim 10, further including the steps of:
   (7) applying the control module to transmit a setting data for setting up the laser power of the high-power laser; and
   (8) applying the high-power laser source to emit the first laser light beam.

* * * * *